US008805415B2

(12) United States Patent
Sennett et al.

(10) Patent No.: US 8,805,415 B2
(45) Date of Patent: Aug. 12, 2014

(54) SYSTEMS AND METHODS FOR DETERMINATION OF MOBILE DEVICES IN OR PROXIMATE TO AN ALERT AREA (75) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1420 days.

(21) Appl. No.: 12/057,822

(22) Filed: Mar. 28, 2008

(65) Prior Publication Data

US 2009/0247189 A1 Oct. 1, 2009

(51) Int. Cl.
*H04W 24/00* (2009.01)

(52) U.S. Cl.
USPC ........................................ 455/456.2; 370/338

(58) Field of Classification Search
CPC ....... H04W 4/04; H04W 48/04; H04W 40/20; H04W 4/02
USPC ..................... 455/404.1–404.2, 414.1–414.3, 455/456.1–457
See application file for complete search history.

(56) References Cited

U.S. PATENT DOCUMENTS

| | | | |
|---|---|---|---|
| 6,112,075 A | 8/2000 | Weiser | 455/404 |
| 6,169,899 B1 * | 1/2001 | Havinis et al. | 455/433 |
| 6,172,644 B1 * | 1/2001 | Stilp | 342/457 |
| 6,212,392 B1 * | 4/2001 | Fitch et al. | 455/456.2 |
| 6,731,932 B1 * | 5/2004 | Rune et al. | 455/432.1 |
| 6,745,021 B1 * | 6/2004 | Stevens | 455/404.1 |
| 7,136,636 B1 * | 11/2006 | McLaughlin | 455/423 |
| 2003/0186710 A1 * | 10/2003 | Muhonen et al. | 455/456.5 |
| 2004/0198398 A1 * | 10/2004 | Amir et al. | 455/456.6 |
| 2005/0009508 A1 * | 1/2005 | Graske et al. | 455/414.3 |
| 2005/0009521 A1 * | 1/2005 | Preece | 455/435.1 |
| 2005/0013417 A1 * | 1/2005 | Zimmers et al. | 379/37 |
| 2006/0001539 A1 * | 1/2006 | Adamczyk et al. | 340/539.18 |
| 2006/0040639 A1 | 2/2006 | Karl et al. | 455/404.1 |
| 2006/0223494 A1 * | 10/2006 | Chmaytelli et al. | 455/404.2 |
| 2006/0271633 A1 * | 11/2006 | Adler | 709/206 |
| 2007/0287474 A1 * | 12/2007 | Jenkins et al. | 455/456.2 |
| 2008/0139165 A1 * | 6/2008 | Gage et al. | 455/404.1 |
| 2009/0005077 A1 * | 1/2009 | Forstall et al. | 455/456.2 |
| 2009/0005972 A1 * | 1/2009 | de Koning | 701/208 |

FOREIGN PATENT DOCUMENTS

WO   WO 2008/079092 A1 * 7/2008 ............... H04Q 7/38

* cited by examiner

*Primary Examiner* — Marcos Batista
(74) *Attorney, Agent, or Firm* — Baker & Hostetler LLP (57) ABSTRACT Systems and methods for determining whether a mobile device is within a specified area and for providing information related to the mobile device are disclosed. A request may be received which inquires as to whether any mobile devices are within an alert area. The request may include a description of the alert area and other preferences or indications. The relevant devices may be determined, as well as related information such as user information. The relevant information may be provided to the requester by any effective means and in any effective format.

20 Claims, 6 Drawing Sheets

SYSTEMS AND METHODS FOR DETERMINATION OF MOBILE DEVICES IN OR PROXIMATE TO AN ALERT AREA

TECHNICAL FIELD

The technical field generally relates to communications systems and more specifically relates to systems and methods for determining if a mobile device is in or proximate to an alert area.

BACKGROUND

Large scale emergency situations are an unfortunate reality of today's world. Whether the result of an accident or an intentional act, when an explosion, building collapse, terrorist attack, or a similar event occurs, many people in the immediate area may be affected. Those who respond first to such events have a need to determine how many people are involved, and where those people may be located. This is very difficult in today's mobile society. There is currently no simple way to determine who may have been in a building when it collapsed or at the scene of an explosion. Any information that would indicate the potential presence of survivors or victims in an area may be helpful to emergency response authorities. Such information may guide first responders in planning how to address the situation and allocate resources. Such information may also be helpful to family members and others concerned about people who may have been involved in the situation.

SUMMARY

Systems and methods are provided for determining mobile devices in or proximate to an alert area. An alert area may be any area affected by an incident or any area threatened by an incident that may be evacuated. A request may be received to determine if any mobile devices are located in or near the alert area. A system may examine location records associated with mobile devices and determine if there are any devices that have had their most recent registration or other contact with a network from the alert area. The system may also determine information associated with the identified mobile devices, such as user names. A response may be provided to the requester. The response may be in a format requested by the requester.

In another embodiment, a system is provided which accepts alert area information and automatically determines the devices which were last contacted in the alert area. Such a system may be used by first responders and may be accessed from a mobile device or from other computing devices.

Other objects, features, and advantages of the present invention will become apparent after review of the Brief Description of the Drawings, Detailed Description, and the Claims.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described. It should be understood that the explanations illustrating data or signal flows are only exemplary. The following description is illustrative and non-limiting to any one aspect.

Incidents may occur where explosions or building collapses affect an area where many people may be present. Similarly, dangerous substances may be released into an area, and those in the area may be affected by the substances. Such incidents may be due to accident or malicious activity. The area in which an explosion or other large scale incident occurs, or where a dangerous substance, such as a radioactive, biological, or chemical agent, or any other harmful substance, is released and/or has spread may be referred to as an alert area. Various means and methods of determining the shape, size, and location of an alert area created by a large scale incident or the release of a substance are known to those skilled in the art and will not be recited herein. All such means and methods are contemplated as within the scope of the present disclosure.

A warning, notice, or threat of some kind may be received or otherwise known before an incident which results in an evacuation. The area that is projected to be affected by the threatened incident may also be referred to as an alert area. Similar means may be used to determine the size, shape, and location of an evacuation area as are used to determine the impact of an actual incident.

Figure 1:
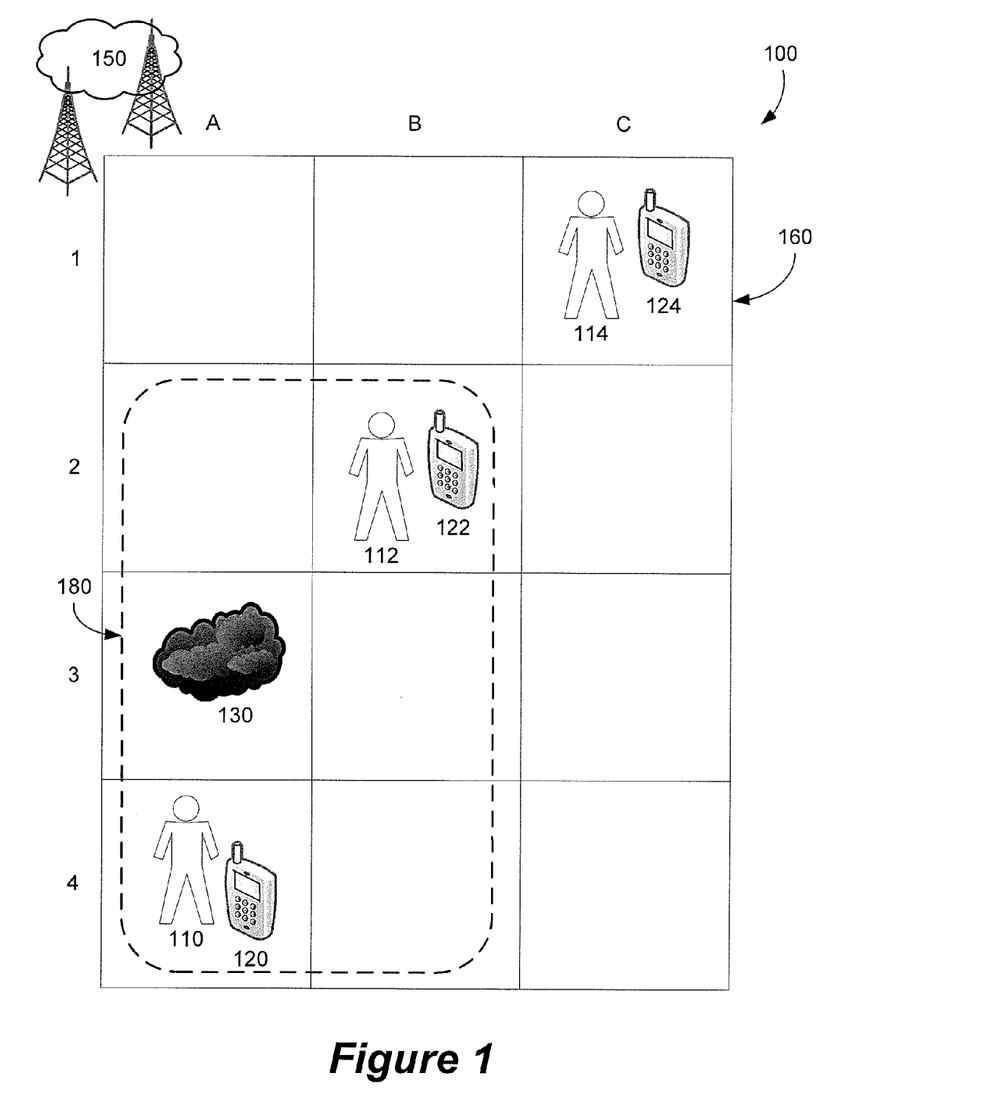
FIG. 1 is a block diagram of a user and an area in which the present method and system may be implemented.

FIG. 1 illustrates and exemplary, non-limiting area 100 in which the present disclosure may be implemented. Area 100 is an example of a geographical area in which a mobile communications device may be transported and/or operated. Area 100 may include portions which are covered by one or more wireless networks, enabling a mobile device to function in a home network, a roaming network, or both. Area 100 may also include portions which are not covered by any wireless network in which the user's mobile device can operate. The size and shape of area 100 can be any size and shape possible for a geographical area. Area 100 as illustrated in FIG. 1 is only exemplary and for purposes of description and is not intended to limit the present subject matter in any way.

User 110 is present in area 100 with mobile device 120. Mobile device 120 may be any device that is capable of operating on a wireless mobile communications network and that communicates with other devices using, at least in part, a wireless network. Examples of such devices include, but are not limited to, mobile telephones, mobile computers, personal data assistants ("PDAs"), navigation systems, vehicle communication systems, and wirelessly networked computers. Any device which can communicate with any other device by communicating, at least in part, wirelessly through a wireless network is contemplated as being within the scope of the present disclosure.

Mobile device 120 may include global positioning system ("GPS") components and/or software, enabling it to communicate with GPS satellites and determine its own location, speed, direction, and the current time. Mobile device 120 may be constructed such that it can communicate GPS-derived location and direction information to a telecommunications network, other devices, and/or user 110. Mobile device 120 may include other means of determining its own location, speed, and/or direction, including receiving such information from a telecommunications network, or deriving such information from the use of technologies well known to those skilled in the art that utilize one or more cellular towers and analysis of signal strength, time delays, angles of arrival, or other measurements to determine a device's location. Such locating means include, but are not limited to, triangulation and hyperbolic fixing schemes. Such locating means may use time delays between mobile device 120 and two or more cellular towers to determine a relatively precise location for mobile device 120. The various means and methods of locating a device using cellular network measurements, including the use of time delay and/or signal strength to determine the location, speed, and/or direction of a mobile device, are well known to those skilled in the art, and therefore will not be recited herein. Any means of determining a mobile device's current or past location, speed, and/or direction are contemplated as within the scope of the present disclosure.

Mobile device 120 may be provided with wireless service, at least in part, by network 150. Network 150 may be any network that facilitates wireless communications, may also include wired communication capabilities, and may communicate with other wired and wireless networks. Any and all such networks are contemplated as within the present disclosure. Examples of such networks include telephony radio networks such as global system for mobile communication ("GSM") networks and code division multiple access ("CDMA") networks, wireless computer networks such as Wi-Fi and IEEE 802.11 networks, and wired networks such as local area networks ("LANs"), wide area networks ("WANs"), intranets, and the Internet. Network 150 represents any possible such network or combination of such networks, including a wireless network that may connect to the Internet and communicate with other devices that are connected, directly or indirectly, to the Internet.

User 112 may also be present within area 100, and may be operating or carrying mobile device 122. Likewise, user 114 may also be present within area 100 and may be operating or carrying mobile device 124. Mobile devices 122 and 124 may be any devices such as those described with regard to mobile device 120, and may also be operative with network 150, or any other network such as those described with regard to network 150.

Area 100 is overlaid by virtual grid 160. Grid 160 is not physically present in area 100, but serves as a logical tool for referencing sections of area 100. Grid 160 divides area 100 into sections that may be easily referenced by grid coordinates. For example, user 110 is present in section A4 of grid 160, user 112 is present in section B2 of grid 160, and user 114 is present in section C1 of grid 160. Grid 160 serves only as an example of how an area, such as area 100, may be logically divided and referenced. Another example of how a geographical area may be divided and referenced is by ZIP codes. Yet another example of how a geographical area may be divided and referenced, particularly one served by a wireless telecommunications network, is by tower locations. For instance, the coverage area of each tower may be designated as a geographical division. Any other method or means of creating and referencing sections or portions of a geographical area are contemplated as within the scope of the present disclosure.

Within area 100, an incident such as an explosion, building collapse, or the release of a dangerous substance may occur at site 130 in section A3 of grid 160. Alternatively, the incident at site 130 may be a threatened incident, and an area of evacuation may be determined. The incident or threat at site 130 may affect a relatively large geographical area. The incident at site 130 may create an alert area 180. Alert area 180 includes portions of area 100 that are located in sections A2, A3, A4, B2, B3, and B4 of grid 160. Alert area 180 may be determined by evaluating the incident and the environmental factors involved, such as the impact of any explosion or collapse, wind speed and direction, water flow speed and direction, temperature, volatility of any released substance, volume and/or mass of any released substance, or any other factor. Alert area may also be determined, in the case of a threatened incident, by the area of evacuation. Many means and methods of determining an area affected by an incident or evacuation are known to those skilled in the art, and all such means and methods are contemplated as within the scope of the present disclosure.

Network 150 may be collecting location information from mobile devices 120, 122, and 124, such as GPS coordinates. Alternatively, network 150 may be determining location information for mobile devices 120, 122, and 124 using other means, such as collecting information from towers communicating with mobile devices 120, 122, and 124 and performing triangulation, or any other means of determining location information known to those skilled in the art. Network 150 may also collect and/or determine time information, and may associate time information with location information for mobile devices 120, 122, and 124, creating a record of the location of mobile devices 120, 122, and 124 at specific times. Such information may be stored on a device within network 150, such as a Mobile Switching Center ("MSC") or a Home Location Register ("HLR"), or on an associated system. Such information may be stored such that a historical record of location data for each mobile device serviced by network 150 is maintained, and such data may be used to determine the most recent location for a mobile device, such as mobile devices 120, 122, and 124. Alternatively, network 150 may only maintain the most recent location information for each mobile device.

In the event of an incident or threatened incident at site 130, first responders or other authorities may determine the alert area 180. Once alert area 180 is determined, first responders may take immediate actions to address apparent casualties or evacuate alert area 180. First responders may then take steps to determine whether any people remain in alert area 180. In one embodiment, a request may be sent to network 150 to determine whether any mobile devices have been most recently registered or otherwise had their most recent contact in alert area 180. The request may include the alert area, or the alert area may be provided to network 150 via other means. The request may include any other user preferences or information. For example, the request may include an indication of a format for a reply. Any other information or preferences that may be included in a request are contemplated as within the scope of the present disclosure.

In one embodiment, such a request may be transmitted to network 150 within or in the format of a text message, an instant message, an email, a voice message, or any other form of communication. In yet another embodiment, a requester may access a website or other Internet portal which allows the requester to transmit a request to network 150. Such a service may be provided as part an arrangement with public authorities or entities and network 150. Alternatively, a requester may operate an application installed on or otherwise configured on a computing device, mobile device, or any other capable device which facilitates the requester's transmission of a request for determination of mobile device in or proximate to an alert area.

Such a request may be transmitted to network 150 or an associated device or system through any means or method known to those skilled in the art. Many means and methods of transmitting data from one device to another are known, and all such means and methods, including wired and wireless means, are contemplated as within the scope of the present disclosure.

Upon receiving such a request, network 150 may examine any applicable mobile device, such as a HLR, MSC, or a dedicated location history server, for location records to determine which devices have had their most recent activity or contact within alert area 180. For example, mobile device 120 may have registered with network 150 shortly before the incident or threat at site 130 from within alert area 180, and may not have registered in a different area since. Likewise, mobile device 122 may have last registered with network 150 from within alert area 180. Therefore, network 150 may collect and provide information about mobile devices 120 and 122, and users 110 and 112, to the requesting party. Mobile device 124 may have last registered from an area outside alert area 180, and therefore network 150 may not collect any further data about mobile device 124 or user 114.

The information that network 150 may collect and provide to a requester may include any information that may be useful for rescue and/or evacuation purposes. Such information may include the time of last contact with mobile devices 120 and 122. Such information may also include an approximation of the location of mobile devices 120 and 122 at last contact. Other information about users 110 and 112 may be collected and provided, such as names, addresses, and contact information other than mobile device 120 and 122 numbers. Such information may be helpful to authorities in locating family of users 110 and 112, and in determining if users 110 and 112 are in fact somewhere else besides alert area 180.

Once the relevant information is collected, it may be provided to the requesting entity. The information may be transmitted to the device from which the request was received, such as a mobile device, or to a computing device operated by the requester. Alternatively, the information may be transmitted to a different device. In one embodiment, the requester may include in the request an indication that the information be directed to a specific device or multiple devices. Any combination of requesting device and information-receiving device are contemplated as within the scope of the present disclosure.

The determination information may be provided in any effective format or configuration. For example, a listing devices and device operators may be provided. Alternatively, a listing of times for at which specific devices were last contacted may be provided. In yet another alternative, network 150 may provide an approximated area in which devices may be located within alert area 180. Any other format or configuration of information is contemplated as within the scope of the present disclosure.

The determination information may be provided via email, text message, instant message, through an application, within another application such as a spreadsheet, presented on a web page, via voice mail or voice data, or any other effective means or method. Any and all such means and methods are contemplated as within the scope of the present disclosure.

Figure 2:
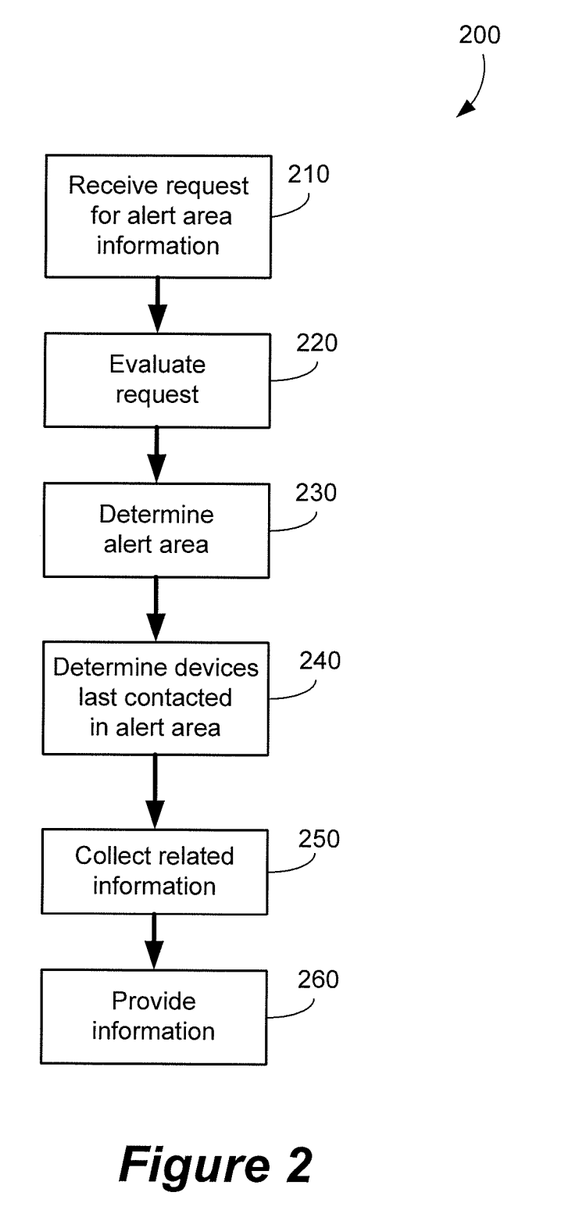
FIG. 2 is a flow diagram of an exemplary, non-limiting method of implementing the present subject matter.

FIG. 2 is a flow diagram of non-limiting, exemplary method 200 of implementing the present subject matter. At block 210, a request is received for alert area information, such as a request for determination of mobile devices in or proximate to an alert area. Such a request may be transmitted from a mobile device by a user operating the mobile device. Alternatively, the request may be transmitting from any other type of device, such as a personal computer or a navigation system. In yet another alternative, the request may be provided orally over a voice call, conveyed using a paper document, or conveyed in person. In yet another embodiment, the request may be received through an application which may be dedicated to submitting requests for determining the mobile devices in or proximate to an alert area and receiving the determination information. Such an application may be a software program operating on a computing device that communicates, directly or indirectly, with a network. Any other means or methods of submitting a request for determination information for mobile devices in an alert area are contemplated as within the scope of the present disclosure.

In another embodiment the request is automatically generated within an application designed to detect the designation of alert areas and determine mobile devices that are in or proximate to the alert area. For example, a first responder may operate a system that allows the first responder to provide a designated alert area, and the system may then automatically generate a request for mobile devices in or proximate to the alert area. Such a system may have other uses, some of which may be related to responding to emergencies or alerts. Such a system may provide a quick way to determine any mobile devices in an area shortly after designating an area as an alert area. In one embodiment, a system is provided through a web-based application or over the Internet. Such a system may employ security measures to ensure that only authorized users can access it. In can be appreciated that similar systems for alert area management may be implemented and all such systems are contemplated as within the scope of the present disclosure.

The request may contain identifying information for the alert area, and/or may contain a description of the alert area, such as the coordinates of the area or a description of the boundaries of the area. For example, the request may include names of streets which form a boundary of the alert area. Any other type of information may be contained within the request and provided to assist in locating mobile device within or proximate to an alert area. All such information is contemplated as within the scope of the present disclosure.

The request may also contain preferences of the sender. In one embodiment, the request may contain an indication of the type of information requested. For example, the request may indicate that the requester wants to know the names of people associated with any mobile devices in the alert area. Alternatively, the request may indicate that the requester wants to know the specific time of last contact by a wireless network with mobile devices in the alert area. In still another embodiment, the request may contain an indication of the desired format of the results, such as a listing or a spreadsheet, and/or the means with which the results are to be provided, such as email or text message. Any and all such user or system preferences and/or indications, and all other forms of preferences and means of indicating such preferences are contemplated as within the scope of the present disclosure.

At block 220, the received request is evaluated to determine what information is requested and how to obtain such information. For example, the request may indicate that a listing of all persons whose mobile devices were recently contacted in the alert area is requested, so it may be determined that a particular database may be searched for a certain subset of records which may contain the requested information. Alternatively, it may be determined that a specific system must be accessed to acquire the requested information. Any evaluation and corresponding actions may be determined and all such evaluations and actions are contemplated as within the scope of the present disclosure.

At block 230, the alert area may be determined. The alert area may be determined from the request, which may contain an indication or otherwise describe the alert area. Alternatively, the alert area may be determined from one or more other sources. For example, a network operator may operate or communicate with a system that maintains records of alert areas and/or transmits alert area information to other devices, systems, or entities. Other methods and means of determining an alert area are contemplated as within the scope of the present disclosure.

At block 240, it may be determined which mobile devices were last contacted in the alert area, or which mobile device may otherwise be present in the alert area. This determination may be made using the alert area information obtained at block 230. The presence of mobile devices in the alert area may be performed by examining registration records or querying databases contained on computing devices. Such records may be stored on a HLR, MSC, or other network device. The actual determination may be performed on a separate device which communicates with such devices. Other methods and means of determining which devices are within an area are known to those skilled in the art and are contemplated as within the scope of the present disclosure.

At block 250, related information may be collected based on the results of the determination at block 240. For example, once devices are identified at block 240, the users or operators of those devices may be determined by querying additional data sources. Alternatively, the last time of contact with those devices may be determined and collected. In yet another alternative, an approximate location within the alert area may be determined for one or more of the devices. Any other information may be determined, located, and/or collected, and all such information is contemplated as within the scope of the present disclosure.

At block 260, a response containing the requested information is provided. This may be a transmission to the requesting device, or to a separate device. The response transmission may be in a format specified in the request, and by a means specified in the request. Any response that effectively communicates the requested information, or a denial of the request for information, is contemplated as within the scope of the present disclosure.

In one embodiment, the requested information is provided to a system or application which allows the requester to perform manipulation of the information. For example, such a system may allow the requester to mark or otherwise indicate mobile devices and/or associated users that have been located, thus allowing a cleared view of those devices and/or users that remain in the alert area. In one embodiment, the application or system is the same application or system that facilitated the transmission of a request for determination information on mobile devices in or proximate to an alert area. Any other form or means of providing determination information is contemplated as within the scope of the present disclosure.

Figure 3:
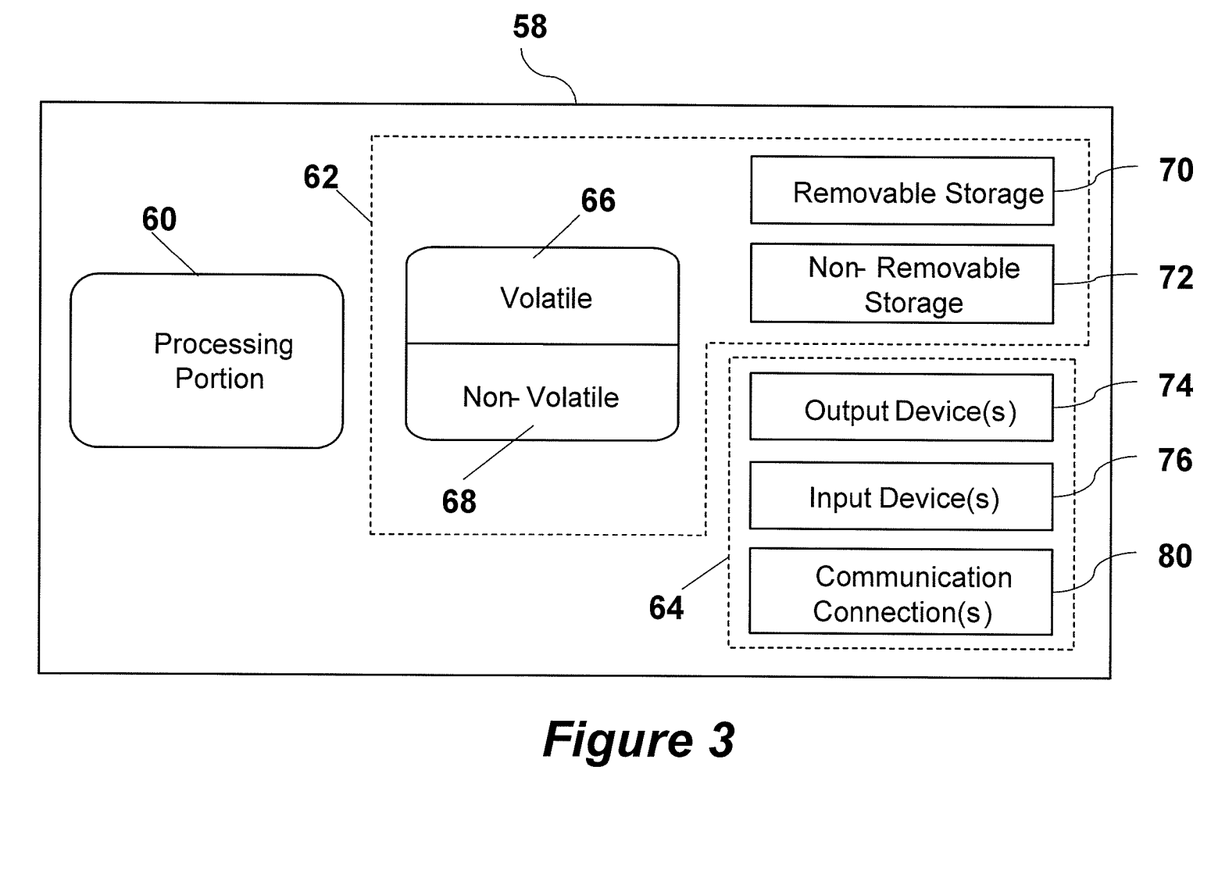
FIG. 3 is a block diagram of an example processor in which the present subject matter may be implemented.

FIG. 3 is a block diagram of an example processor 58 for the determination of mobile devices in or proximate to an alert area and transmitting or receiving such information as well as requests for such information to/from a wireless network. In an example configuration, the processor 58 may be one or more components of mobile devices 120, 122, and 124, and devices within network 150. It is emphasized that the block diagram depicted in FIG. 3 is exemplary and not intended to imply a specific implementation. Thus, the processor 58 can be implemented in a single processor or multiple processors. Multiple processors can be distributed or centrally located. Multiple processors can communicate wirelessly, via hard wire, or a combination thereof.

The processor 58 comprises a processing portion 60, a memory portion 62, and an input/output portion 64. The processing portion 60, memory portion 62, and input/output portion 64 are coupled together (coupling not shown in FIG. 6) to allow communications therebetween. The input/output portion 64 is capable of providing and/or receiving components utilized to determine if mobile devices are in or proximate to an alert area and transmit or receive such information as well as requests for such information. For example, the input/output portion 64 is capable of providing/receiving mobile device 120 location information, accepting/receiving requests for location information on/from mobile device 120, transmitting/receiving requests for device and location information and the corresponding device operator information, processing requests for the determination of mobile devices in or proximate to an alert area, and executing programs and applications related to the determination of mobile devices in or proximate to an alert area, or any combination thereof, as described above.

The processor 58 can be implemented as a client processor and/or a server processor. In a basic configuration, the processor 58 may include at least one processing portion 60 and memory portion 62. The memory portion 62 can store any information utilized in conjunction with the determination of mobile devices in or proximate to an alert area and transmitting or receiving such information as well as requests for such information. For example, as described above, the memory portion is capable of storing device location information, a history of device location information, applications and software to determine if mobile devices are in or proximate to an alert area, or any combination thereof. Depending upon the exact configuration and type of processor, the memory portion 62 can be volatile (such as RAM) 66, non-volatile (such as ROM, flash memory, etc.) 68, or a combination thereof. The processor 58 can have additional features/functionality. For example, the processor 58 can include additional storage (removable storage 70 and/or non-removable storage 72) including, but not limited to, magnetic or optical disks, tape, flash, smart cards or a combination thereof. Computer storage media, such as memory portion 62, 70, 72, 66, and 68, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 58. Any such computer storage media can be part of the processor 58.

The processor 58 can also contain the communications connection(s) 80 that allow the processor 58 to communicate with other devices, for example through network 150. Communications connection(s) 80 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land-line telephone, and wireless media such as acoustic, RF, infrared, cellular, and other wireless media. The term computer readable media as used herein includes both storage media and communication media. The processor 58 also can have input device(s) 76 such as keyboard, keypad, mouse, pen, voice input device, touch input device, etc. Output device(s) 74 such as a display, speakers, printer, etc. also can be included.

The following description sets forth some exemplary telephony radio networks and non-limiting operating environments in which the determination of mobile devices in or proximate to an alert area may be implemented. The below-described operating environments should be considered non-exhaustive, however, and thus the below-described network architectures merely show how the determination of mobile devices in or proximate to an alert area can be incorporated into existing network structures and architectures. It can be appreciated, however, that the determination of mobile devices in or proximate to an alert area may be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques used to determine if mobile devices are in or proximate to an alert area may be applied independently of the method for data transport, and do not depend on any particular network architecture, or underlying protocols.

Figure 4:
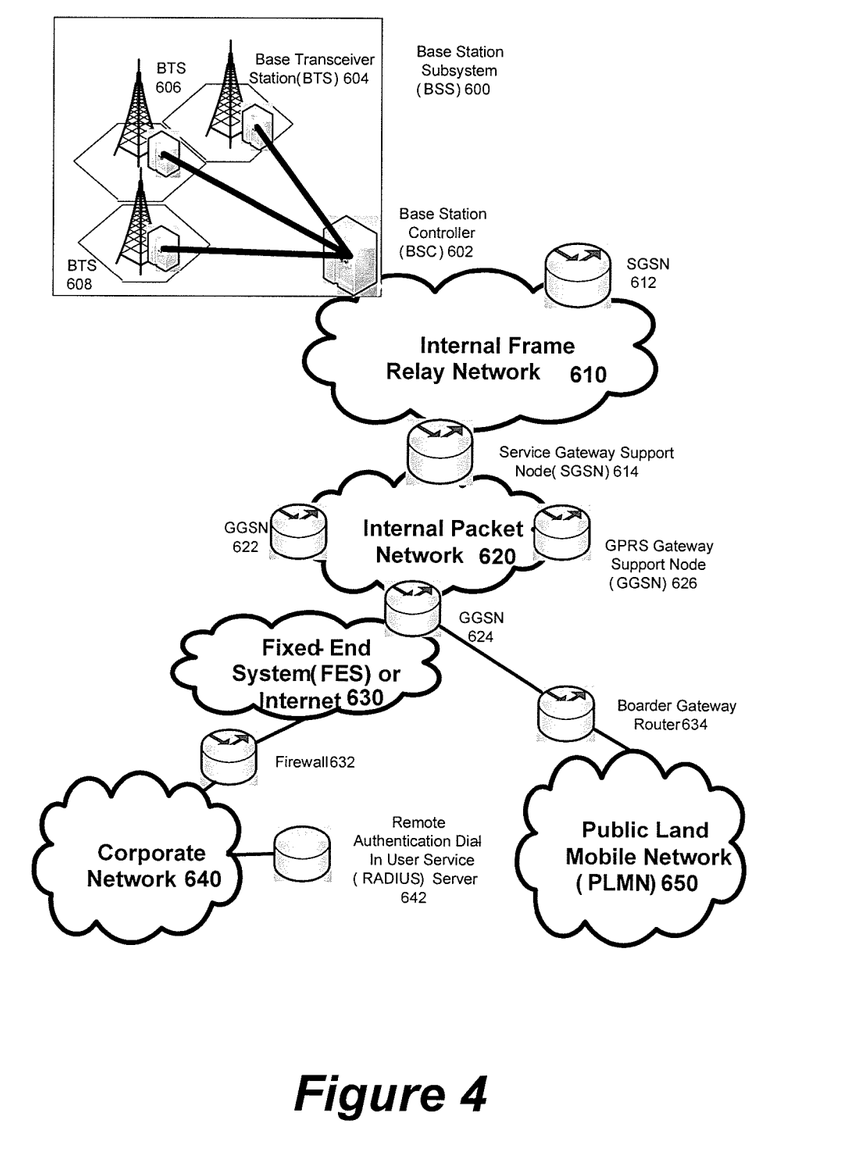
FIG. 4 is an overall block diagram of an exemplary packet-based mobile cellular network environment, such as a GPRS network, in which the present subject matter may be implemented.

FIG. 4 depicts an overall block diagram of an exemplary packet-based mobile cellular network environment, such as a GPRS network, in which a system for the determination of mobile devices in or proximate to an alert area may be practiced. In a non-limiting example configuration, network 150 comprises a cellular radio network and towers which are encompassed by the network environment depicted in FIG. 4. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., mobile device 120) become connected to the wireless network. In exemplary fashion, the packet traffic originating from user devices (e.g., mobile device 120) is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via border gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 5:
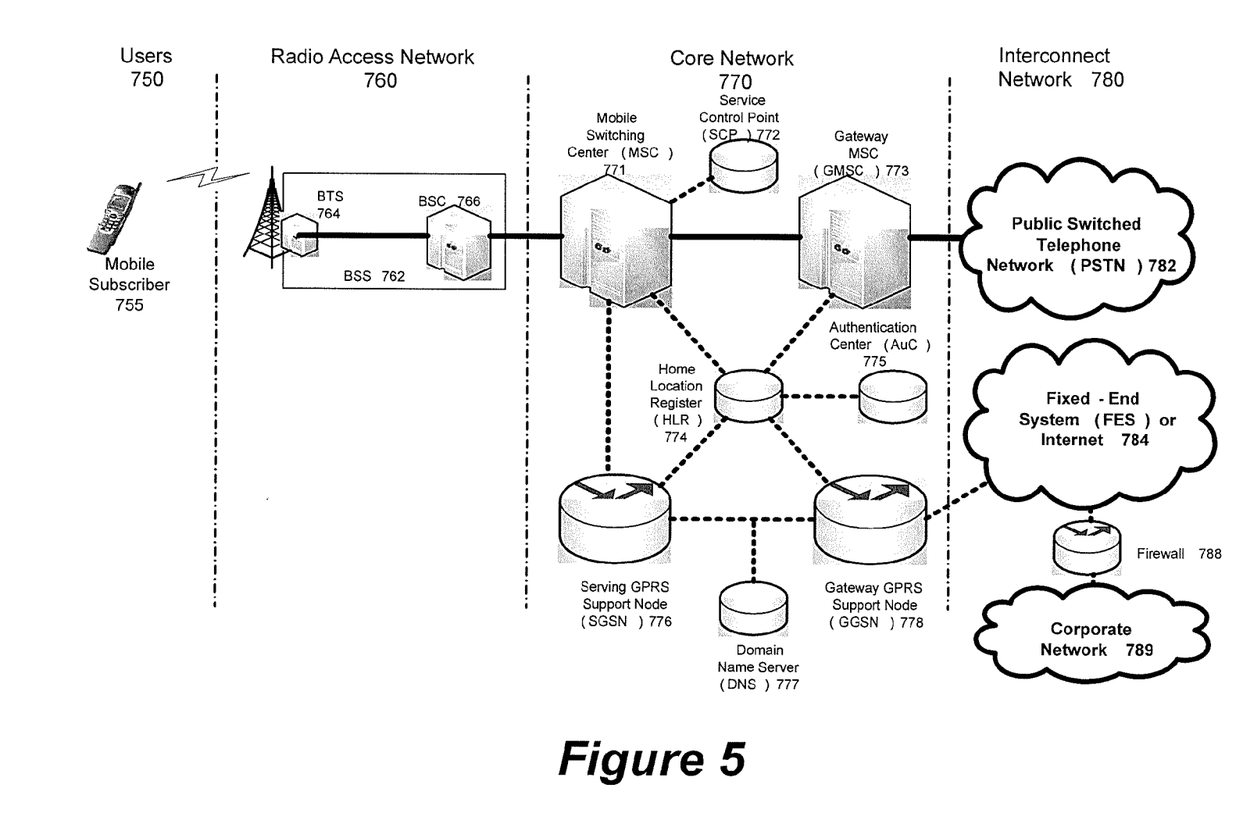
FIG. 5 illustrates an architecture of a typical GPRS network as segmented into four groups.

FIG. 5 illustrates an architecture of a typical GPRS network as segmented into four groups: users 750, radio access network 760, core network 770, and interconnect network 780. In one example configuration, network 150 is encompassed by the radio access network 760, core network 770, and interconnect network 780. Users 750 comprise a plurality of end users (though only mobile subscriber 755 is shown in FIG. 8). In an example embodiment, the device depicted as mobile subscriber 755 may comprise mobile device 120, mobile device 122, or mobile device 124. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 5, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user, such users 110, 112, and 114, and sometimes to the actual portable device, such as mobile devices 120, 122, and 124, used by an end user of the mobile cellular service. When a mobile subscriber turns on his or her mobile device, the mobile device goes through an attach process by which the mobile device attaches to an SGSN of the GPRS network. In FIG. 5, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 5) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of determining previous occupation in or proximate to an alert area can include but are not limited to Gateway GPRS Support Node tables, Fixed End System router tables, firewall systems, VPN tunnels, and any number of other network elements as required by the particular digital network.

Figure 6:
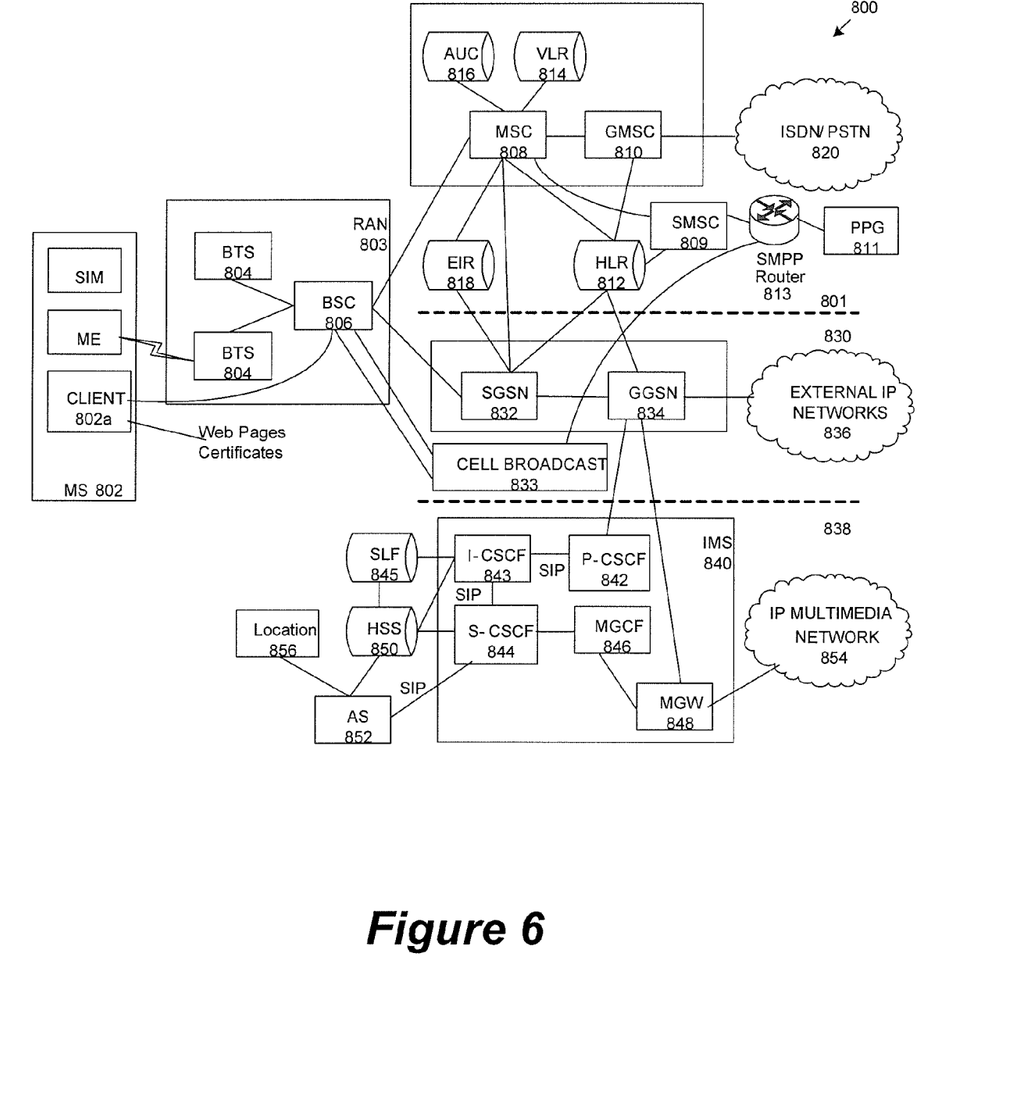
FIG. 6 illustrates an example alternate block diagram of an exemplary GSM/GPRS/IP multimedia network architecture in which the present subject matter may be implemented.

FIG. 6 illustrates another exemplary block diagram view of a GSM/GPRS/IP multimedia network architecture 800 in which determining previous occupation in or proximate to an alert area may be incorporated. As illustrated, architecture 800 of FIG. 6 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., mobile device 120) that is used by mobile subscribers, that may have a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AUC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictate to a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not have received pages from a circuit switched domain when engaged in a data call, since the MS is receiving data and is not listening to a paging channel. In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown.) It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.) When the mobile phones leave the area, they register with the network in their new location as being outside the predefined area. This registration, however, does not indicate the actual physical location of the mobile phones outside the pre-defined area.

While example embodiments of systems and methods to determine if mobile devices are in or proximate to an alert area have been described in connection with various computing devices, the underlying concepts can be applied to any computing device or system capable of implementing the determination of mobile devices in or proximate to an alert area. The various techniques described herein can be implemented in connection with hardware or software or, where appropriate, with a combination of both. Thus, the methods and apparatus for the determination of mobile devices in or proximate to an alert area and transmitting or receiving such information as well as requests for such information, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for the determination of mobile devices in or proximate to an alert area. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for the determination of mobile devices in or proximate to an alert area also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for the determination of mobile devices in or proximate to an alert area. When implemented on a general-purpose processor, the program code combines with the processor to provide a unique apparatus that operates to invoke the functionality of the determination of mobile devices in or proximate to an alert area. Additionally, any storage techniques used in connection with the determination of mobile devices in or proximate to an alert area can invariably be a combination of hardware and software.

While the determination of mobile devices in or proximate to an alert area has been described in connection with the various embodiments of the various figures, it is to be understood that other similar embodiments can be used or modifications and additions can be made to the described embodiment for performing the same function of the determination of mobile devices in or proximate to an alert area without deviating therefrom. For example, one skilled in the art will recognize that a system for the determination of mobile devices in or proximate to an alert area as described may apply to any environment, whether wired or wireless, and may be applied to any number of devices connected via a communications network and interacting across the network. Therefore, the determination of mobile devices in or proximate to an alert area should not be limited to any single embodiment, but rather should be construed in breadth and scope in accordance with the appended claims.

What is claimed:

1. A method comprising:
   receiving, at a server configured in a network, a request to determine a plurality of mobile devices proximate to an alert area;
   determining, at the server, the alert area;
   determining, at the server, a respective location history for each of the plurality of mobile devices most recently contacted within the alert area;
   determining, at the server, a respective most recent location for each of the plurality of mobile devices;
   determining, at the server, that the respective most recent location for each of the plurality of mobile devices is within the alert area
   determining, at the server, a respective user identifier for each of the plurality of mobile devices;
   determining, at the server, a respective most recent time of contact for each of the plurality of mobile devices; and
   providing, from the server, a response comprising a listing identifying each of the plurality of mobile devices, the respective user identifier for each of the plurality of mobile devices, the respective most recent location for each of the plurality of mobile devices, and the respective most recent time of contact for each of the plurality of mobile devices.

2. The method of claim 1, wherein the request comprises an identification of the alert area.

3. The method of claim 1, wherein the request is received from a first mobile device.

4. The method of claim 3, wherein providing the response comprises transmitting a response to a second mobile device.

5. The method of claim 1, wherein the request comprises a response format indication.

6. The method of claim 5, wherein the response is provided in a format indicated by the response format indication.

7. The method of claim 1, wherein determining the respective location history for each of the plurality of mobile devices is based on registration records queried on a network device.

8. A system comprising at least one subsystem that:
   receives, at a server configured in a network, a request to determine a plurality of mobile devices proximate to an alert area;
   determines, at the server, geographical boundaries of an alert area location comprising names of streets bounding the alert area;

acquires, at the server, a respective location history for each of the plurality of mobile devices most recently contacted from within the alert area;

determines, at the server, a respective most recent location for each of the plurality of mobile devices;

determines, at the server, that the respective most recent location for each of the plurality of mobile devices is within the alert area;

determines, at the server, a respective user identifier for each of the plurality of mobile devices;

determines, at the server, a respective most recent time of contact for each of the plurality of mobile devices; and provides, from the server, a response comprising a listing identifying each of the plurality of mobile devices, the respective user identifier for each of the plurality of mobile devices, the respective most recent location for each of the plurality of mobile devices, and the respective most recent time of contact for each of the plurality of mobile devices.

9. The system of claim 8, wherein the request comprises a response format indication.

10. The system of claim 9, wherein the response is provided in a format indicated by the response format indication.

11. The system of claim 8, wherein the response comprises the names of the streets bounding the alert area.

12. The system of claim 8, wherein the request comprises an alert area location.

13. The system of claim 8, wherein the at least one subsystem that determines the respective most recent location for each of the plurality of mobile devices comprises at least one subsystem that determines a respective most recent global positioning system coordinates for each of the plurality of mobile devices.

14. The system of claim 8, wherein the response comprises an indication that each of the plurality of mobile devices is proximate to the alert area.

15. A non-transitory computer-readable medium, having stored thereon instructions for:

receiving a request at a server configured on a network to determine a plurality of mobile devices proximate to an alert area;

receiving an identification of the alert area at the server;

automatically determining at the server a respective location history for each of the plurality of mobile devices most recently contacted within the alert area location;

automatically determining at the server a respective most recent location for each of the plurality of mobile devices;

automatically determining at the server that the respective most recent location for each of the plurality of mobile devices is within the alert area;

automatically determining at the server a respective user identifier for each of the plurality of mobile devices;

automatically determining at the server a respective most recent time of contact for each of the plurality of mobile devices; and providing a response comprising a listing identifying each of the plurality of mobile devices, the respective user identifier for each of the plurality of mobile devices, the respective most recent location for each of the plurality of mobile devices, and the respective most recent time of contact for each of the plurality of mobile devices.

16. The non-transitory computer-readable storage medium of claim 15, wherein determining the respective location history for the plurality of mobile devices is based on registration records queried on a network device.

17. The non-transitory computer-readable storage medium of claim 15, wherein the instructions for automatically determining the respective most recent location for each of the plurality of mobile devices comprises instructions for automatically determining respective global positioning system coordinates associated with each of the plurality of mobile devices.

18. The non-transitory computer-readable storage medium of claim 15, wherein the identification of the alert area comprises names of streets bounding the alert area.

19. The non-transitory computer-readable storage medium of claim 15, wherein the instructions for providing a response comprise instructions for providing output to a web-based application.

20. The non-transitory computer-readable storage medium of claim 15, wherein the instructions for receiving the identification of the alert area comprise instructions for receiving input at a web-based application.

* * * * *